(12) United States Patent
Nabeyama et al.

(10) Patent No.: US 10,902,692 B2
(45) Date of Patent: Jan. 26, 2021

(54) VALUABLE MEDIUM PROCESSING APPARATUS, INFORMATION PROCESSING APPARATUS, VALUABLE MEDIUM PROCESSING SYSTEM, AND VALUABLE MEDIUM PROCESSING METHOD

(71) Applicant: GLORY LTD., Hyogo (JP)

(72) Inventors: Kouichi Nabeyama, Hyogo (JP); Koichi Nishida, Hyogo (JP); Tomohiro Yokoo, Hyogo (JP); Atsushi Sakamoto, Hyogo (JP)

(73) Assignee: GLORY, LTD., Hyogo (JP)

( * ) Notice: Subject to any disclaimer, the term of this patent is extended or adjusted under 35 U.S.C. 154(b) by 0 days.

(21) Appl. No.: 16/369,173

(22) Filed: Mar. 29, 2019

(65) Prior Publication Data

US 2019/0304234 A1    Oct. 3, 2019

(30) Foreign Application Priority Data

Mar. 30, 2018  (JP) .................................. 2018-068239

(51) Int. Cl.
*G07D 11/40* (2019.01)
*G07D 11/32* (2019.01)
(Continued)

(52) U.S. Cl.
CPC .......... *G07D 11/235* (2019.01); *G06K 7/1408* (2013.01); *G07D 11/009* (2013.01);
(Continued)

(58) Field of Classification Search
CPC ........ G07D 11/00; G07D 11/13; G07D 11/12; G07D 11/16; G07D 11/24; G07D 11/50
(Continued)

(56) References Cited

U.S. PATENT DOCUMENTS

| 7,025,236 | B1 * | 4/2006 | Naujock | ..................... | B62J 9/00 |
| | | | | | 224/413 |
| 2007/0052147 | A1 * | 3/2007 | Tamura | .............. | G03G 15/6582 |
| | | | | | 270/58.07 |

(Continued)

FOREIGN PATENT DOCUMENTS

| GB | 2325327 A | 11/1998 |
| JP | 2016-146142 A | 8/2016 |
| WO | 2016001627 A1 | 1/2016 |

OTHER PUBLICATIONS

Extended European Search Report EP19165119.9 dated Sep. 23, 2019, 8 pages.

*Primary Examiner* — Edwyn Labaze
(74) *Attorney, Agent, or Firm* — Brundidge & Stanger, P.C.

(57) ABSTRACT

A valuable medium processing apparatus that stores a valuable medium in a storage bag, the valuable medium processing apparatus having: a mounting sections, the storage bag being mounted on the mounting sections; an acquisition section that acquires recognition information attached to the storage bag, and mounting information of the mounting section to which the storage bag has been mounted; and an association section that associates the recognition information with the mounting information, the recognition information and the mounting information being acquired by the acquisition section.

17 Claims, 9 Drawing Sheets

(51) Int. Cl.
    *G06K 7/14*     (2006.01)
    *G07D 11/00*     (2019.01)
    *G07D 11/30*     (2019.01)
    *G07D 11/24*     (2019.01)
    *G07D 11/34*     (2019.01)
    *G07D 11/235*     (2019.01)
    *G07D 11/125*     (2019.01)

(52) U.S. Cl.
    CPC ........... *G07D 11/125* (2019.01); *G07D 11/24* (2019.01); *G07D 11/30* (2019.01); *G07D 11/32* (2019.01); *G07D 11/34* (2019.01); *G07D 11/40* (2019.01)

(58) Field of Classification Search
    USPC ....................... 235/379, 375, 487; 705/35–45
    See application file for complete search history.

(56) References Cited

U.S. PATENT DOCUMENTS

| | | | |
|---|---|---|---|
| 2013/0138242 A1* | 5/2013 | Kallin | G07D 11/16 700/230 |
| 2013/0213763 A1* | 8/2013 | Rao | G07D 11/12 194/350 |
| 2013/0228104 A1* | 9/2013 | Susaki | E05G 1/005 109/23 |
| 2014/0339301 A1 | 11/2014 | Angus et al. | |
| 2017/0256114 A1* | 9/2017 | Shimura | G07D 11/25 |

* cited by examiner

| STORAGE BAG RECOGNITION INFORMATION | FRAME INFORMATION |
|---|---|
| 123456789 | A |

| STORAGE BAG RECOGNITION INFORMATION | FRAME INFORMATION |
|---|---|
| 123456789 | A |
| 9876543231 | B |

S11: USER MOUNTS STORAGE BAG 21 ON FRAME 7, AND MOUNTS STORAGE BAG 22 ON FRAME 8

S12: USER READS BAR CODE 91 OF FRAME 7

S13: USER READS BAR CODE OF STORAGE BAG 21 MOUNTED ON FRAME 7, BAR CODE 91 OF WHICH BEING READ

S14: USER READS BAR CODE OF FRAME 8

S15: USER READS BAR CODE OF STORAGE BAG 22 MOUNTED ON FRAME 8, BAR CODE OF WHICH BEING READ

VALUABLE MEDIUM PROCESSING APPARATUS, INFORMATION PROCESSING APPARATUS, VALUABLE MEDIUM PROCESSING SYSTEM, AND VALUABLE MEDIUM PROCESSING METHOD

CROSS REFERENCE TO RELATED APPLICATIONS

This application is entitled to and claims the benefit of Japanese Patent Application No. 2018-068239, filed on Mar. 30, 2018, the disclosure of which including the specification, drawings and abstract is incorporated herein by reference in its entirety.

TECHNICAL FIELD

The present invention relates to a valuable medium processing apparatus, an information processing apparatus, a valuable medium processing system, and a valuable medium processing method.

BACKGROUND ART

PTL 1 discloses a banknote storage mechanism that stores a banknote in a storage bag such as a pouch bag. Additionally, PTL 1 discloses that regulation of access to storage bags prevents a storage bag other than a storage bag to be retrieved from being detached from a mounting section to be retrieved, and anti-theft property is enhanced.

CITATION LIST

Patent Literature

PTL 1
Japanese Patent Application Laid-Open No. 2016-146142

SUMMARY OF INVENTION

Technical Problem

However, in a case in which a plurality of storage bags are set in an apparatus, when a storage bag mounting place is mistaken, an inventory amount of the banknotes in the storage bag, and an inventory amount, data of which is managed by the apparatus, are sometimes different.

For example, it is fixed that a storage bag a is set in a mounting section A of a banknote processing apparatus, and a storage bag b is set in a mounting section B of the banknote processing apparatus. However, in a case in which the storage bag a is set in the mounting section B of the banknote processing apparatus, and the storage bag b is set in the mounting section A of the banknote processing apparatus, respective inventory amounts of banknotes stored in the storage bags a, b, and the inventory amounts of the storage bags a, b, each data of which is managed by the apparatus are sometimes wrongly exchanged.

An object of the present invention is to provide a technology capable of suppressing a mounting error to a valuable medium processing apparatus for a storage bag.

Solution to Problem

A valuable medium processing apparatus of the present invention is an apparatus that stores a valuable medium in a storage bag, the valuable medium processing apparatus including: a mounting section on which the storage bag is to be mounted; an acquisition section that acquires recognition information attached to the storage bag, and mounting information of the mounting section on which the storage bag has been mounted; and an association section that associates the recognition information and the mounting information with each other, the recognition information and the mounting information being acquired by the acquisition section.

An information processing apparatus of the present invention includes: a reception section that receives recognition information from a reading apparatus that reads the recognition information for recognizing a storage bag, the recognition information being attached to the storage bag that stores therein a valuable medium, the storage bag being mounted on a mounting section included in a valuable medium processing apparatus; a mounting information acquisition section that acquires mounting information of the mounting section on which the storage bag having the recognition information attached thereto has been mounted, the recognition information being received by the reception section; and a control section that associates the recognition information received by the reception section and the mounting information acquired by the mounting information acquisition section with each other.

A valuable medium processing system of the present invention includes: a valuable medium processing apparatus that includes a mounting section on which a storage bag storing therein a valuable medium is mounted; and an information processing apparatus that includes: a reception section that receives recognition information from a reading apparatus that reads the recognition information for recognizing the storage bag, the recognition information being attached to the storage bag, a mounting information acquisition section that acquires mounting information of a mounting section on which a storage bag having the recognition information attached thereto has been mounted, the recognition information being received by the reception section, and a control section that associates the recognition information received by the reception section and the mounting information acquired by the mounting information acquisition section with each other.

A valuable medium processing method of the present invention is a method which is performed by a valuable medium processing apparatus that stores a valuable medium in a storage bag, the valuable medium processing method including: receiving recognition information attached to the storage bag to be mounted on a mounting section of the valuable medium processing apparatus; acquiring mounting information of the mounting section on which the storage bag has been mounted; and associating the received recognition information and the acquired mounting information with each other.

Advantageous Effects of Invention

According to the present invention, it is possible to suppress a mounting error to a valuable medium processing apparatus for a storage bag.

DESCRIPTION OF EMBODIMENTS

Hereinafter, embodiments of the present invention will be described with reference to the accompanying drawings. Hereinafter, an example in which a valuable medium processing apparatus is applied to a banknote processing apparatus will be described.

Embodiment 1

Figure 1:
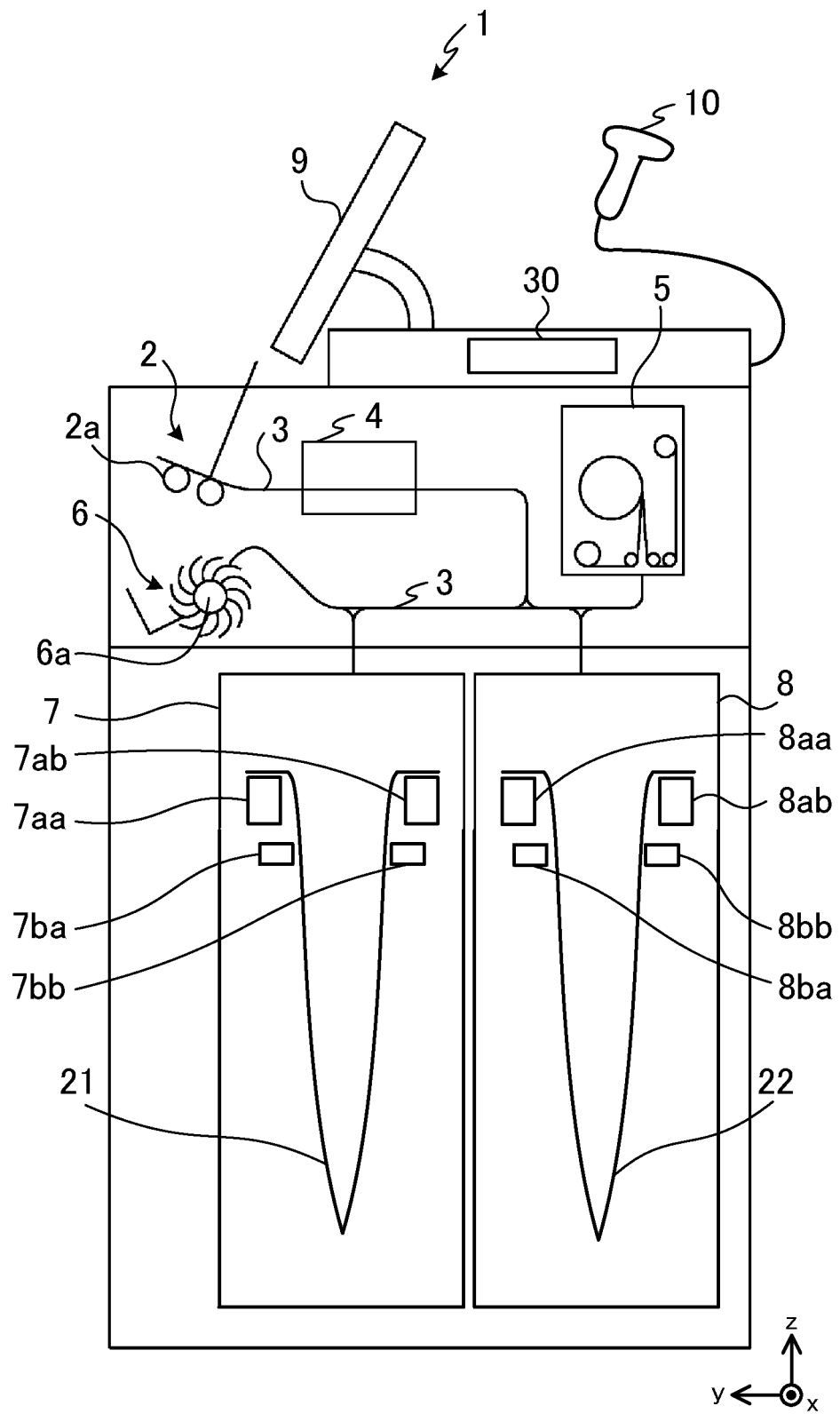
FIG. 1 is a schematic configuration diagram of a banknote processing apparatus according to Embodiment 1.

FIG. 1 is a schematic configuration diagram of a banknote processing apparatus 1 according to Embodiment 1. As illustrated in FIG. 1, the banknote processing apparatus 1 has an inlet section 2, a transport unit 3, a recognition unit 4, a storing/feeding unit 5, an ejection section 6, frames 7, 8, an operation display 9, a bar code reader 10, and a control section 30. FIG. 1 also illustrates storage bags 21, 22 mounted on the frames 7, 8. The banknote processing apparatus 1 illustrated in FIG. 1 is installed in, for example, a shop such as a supermarket, a bank or the like, and performs various processes such as a money reception/payment process. Hereinafter, a rectangular coordinate system of x-, y-, z-axes illustrated in FIG. 1 is set to the banknote processing apparatus 1.

Banknotes are input in the inlet section 2 by a user. The inlet section 2 has a feeding mechanism section 2a. The inlet section 2 feeds out the banknotes input by the user to the transport unit 3 one by one by using the feeding mechanism section 2a.

The recognition unit 4 is provided in the periphery of the transport unit 3 on a downstream side of the inlet section 2 and on an upstream side of the storing/feeding unit 5, the ejection section 6, and the frames 7, 8. The recognition unit 4 includes various sensors (not illustrated), and recognizes denomination, genuineness, face/back, fitness, new/old, and the like of banknotes to be transported by the transport unit 3. The banknotes to be transported by the transport unit 3 are transported to any of the storing/feeding unit 5, the ejection section 6, and the frames 7, 8 (storage bags 21, 22) in accordance with a recognition result of the recognition unit 4, operation of the user, or the like.

The storing/feeding unit 5 includes a so-called winding type banknote storing/feeding mechanism. The storing/feeding unit 5 temporarily stores the banknotes transported by the transport unit 3, and feeds out the temporarily stored banknotes to the transport unit 3.

The banknotes transported from the transport unit 3 are accumulated in the ejection section 6. The ejection section 6 has a stacking wheel driving section 6a that rotates a stacking wheel. The ejection section 6 arrays and accumulates the banknotes transported from the transport unit 3, by the rotating stacking wheel. The user can take out the banknotes accumulated in the ejection section 6, from a front surface of the banknote processing apparatus 1.

The frame 7 has mounting sections 7aa, 1ab, and stages 7ba, 7bb. The storage bag 21 is suspended between the mounting sections 7aa, 7ab. The storage bag 21 is suspended between the mounting sections 7aa, 7ab in a state in which an opening is open. The banknotes to be transported by the transport unit 3 are stored in the storage bag 21 with the opening being open.

The stage 7ba moves toward the stage 7bb in accordance with control of the control section 30 described below. An upper part of the storage bag 21 is closed by movement of the stage 7ba to the stage 7bb (refer to FIG. 5).

The frame 8 has mounting sections 8aa, 8ab, and stages 8ba, 8bb. The storage bag 22 is suspended between the mounting sections 8aa, 8ab. The storage bag 22 is suspended between the mounting sections 8aa, 8ab in a state in which an opening is open. The banknotes to be transported by the transport unit 3 are stored in the storage bag 22 with the opening being open.

The stage 8ba moves toward the stage 8bb in accordance with control of the control section 30 described below. An upper part of the storage bag 22 is closed by movement of the stage 8ba to the stage 8bb (refer to FIG. 5).

The operation display 9 is, for example, a touch panel. The operation display 9 displays various information related to the banknote processing apparatus 1. For example, the operation display 9 displays information related to a processing status of the money reception/payment process of banknotes, the inventory amount of banknotes stored in the storage bags 21, 22, and the like. Additionally, the operation display 9 receives user's operation, and transmits the information of the received user's operation to the control section 30.

The bar code reader 10 reads a bar code. The bar code reader 10 transmits the information of the read bar code to the control section 30.

Only the two frames are illustrated in FIG. 1, but the number of the frames may be three or more. That is, in the banknote processing apparatus 1, three or more storage bags may be mounted, and banknotes may be stored in respective storage bags.

Figure 2:
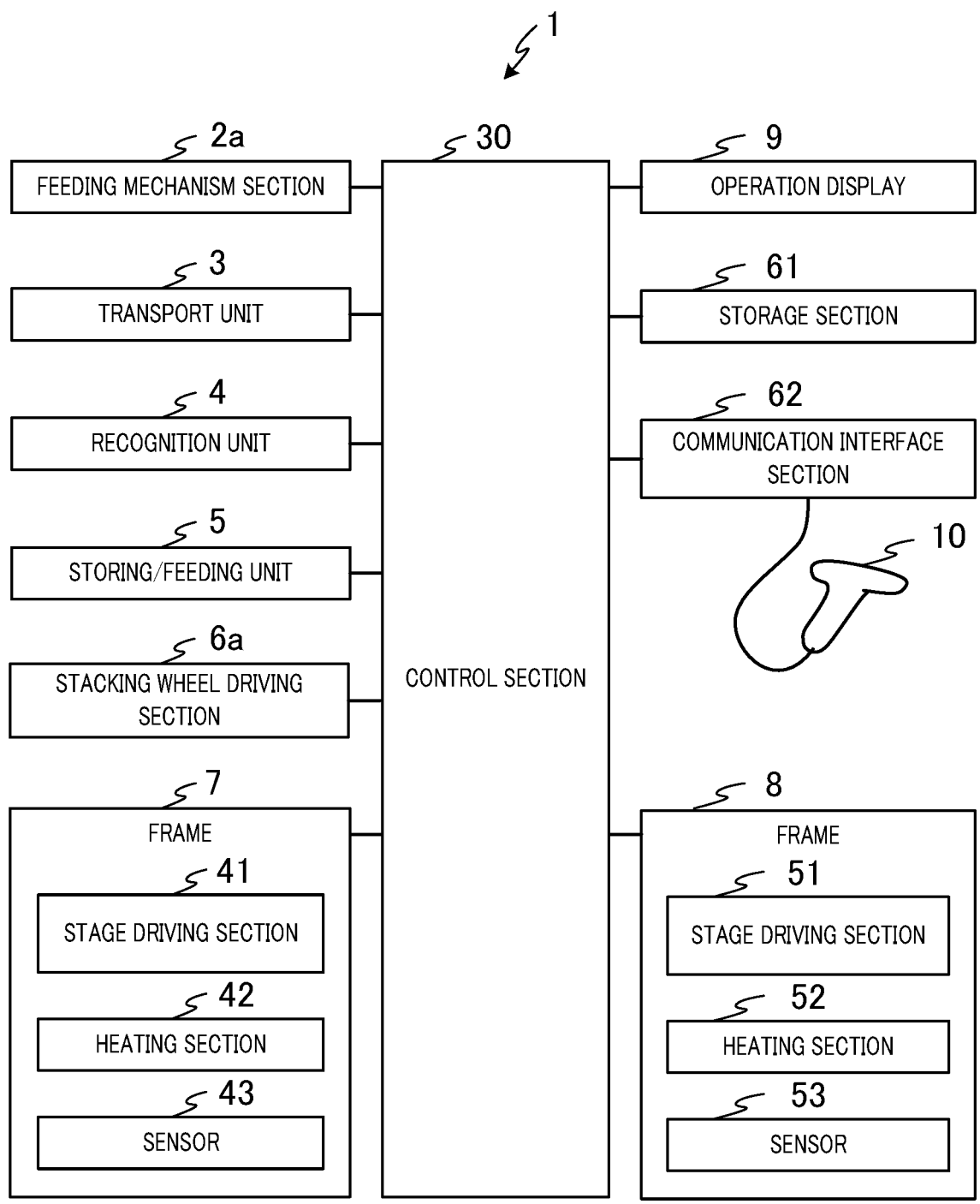
FIG. 2 is a diagram illustrating a block configuration example of a control system of the banknote processing apparatus.

FIG. 2 is a diagram illustrating a block configuration example of a control system of the banknote processing apparatus 1. In FIG. 2, components identical to the components of FIG. 1 are denoted by the same reference numerals.

As illustrated in FIG. 2, the feeding mechanism section 2a, the transport unit 3, the recognition unit 4, the storing/ feeding unit 5, the stacking wheel driving section 6a, the frames 7, 8, and the operation display 9 illustrated in FIG. 1 are connected to the control section 30. Additionally, a storage section 61 and a communication interface section 62, which are not illustrated in FIG. 1 are connected to the control section 30. The control section 30 is composed of, for example, a CPU (Central Processing Unit), and controls the connected respective sections.

The frame 7 has a stage driving section 41, a heating section 42, and a sensor 43. The frame 8 has a stage driving section 51, a heating section 52, and a sensor 53. The stage driving sections 41, 51, the heating sections 42, 52, and the sensors 43, 53 will be hereinafter described in detail.

A program to be operated by the control section 30 is stored in the storage section 61. Additionally, data for performing a calculation process by the control section 30, data for controlling the connected respective sections, and the like are stored in the storage section 61.

The bar code reader 10 is connected to the communication interface section 62. The control section 30 communicates with the bar code reader 10 through the communication interface section 62. The bar code reader 10 may be detachable from the communication interface section 62.

A host apparatus (not illustrated) is connected to the communication interface section 62 through, for example, the Internet. The control section 30 communicates with the host apparatus through the communication interface section 62. For example, the control section 30 transmits the information of the inventory amount of the banknote processing apparatus 1 or the like through the communication interface section 62.

Although later described in FIG. 3, bar codes for recognizing the storage bags 21, 22 are attached to the storage bags 21, 22. The communication interface section 62 receives recognition information indicating the bar codes of the storage bags 21, 22, the bar codes being read by the bar code reader 10. The control section 30 acquires frame information of the frames 7, 8 (information for recognizing the frames 7, 8) to which the storage bags 21, 22 with the recognition information attached thereto are mounted, the recognition information being received by the communication interface section 62, and associates the acquired frame information, with the recognition information received by the communication interface section 62. The control section 30 stores the associated information in the storage section 61.

Figure 3:
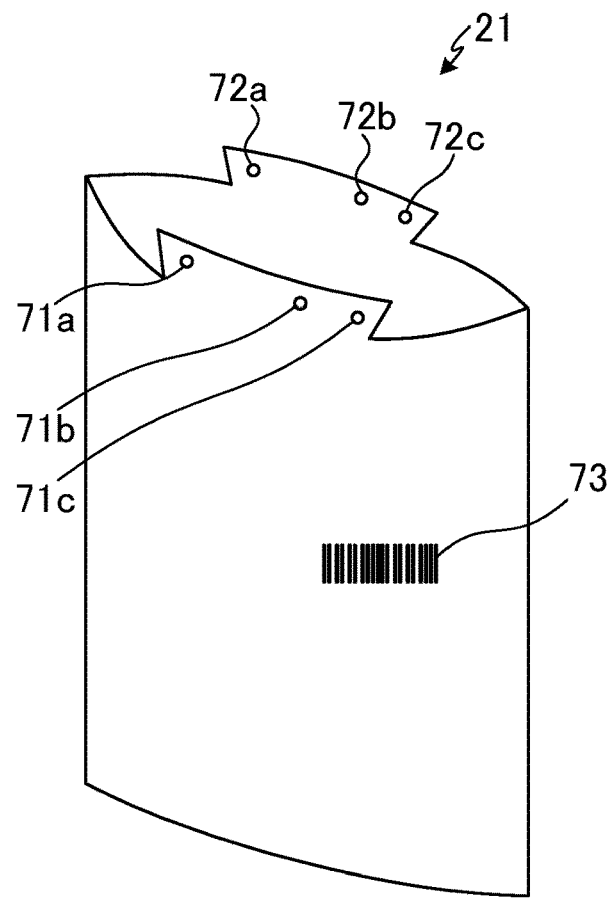
FIG. 3 is a perspective view of a storage bag.

FIG. 3 is a perspective view of the storage bag 21. As illustrated in FIG. 3, the storage bag 21 has holes 71a to 71c, and 72a to 72c in an upper part. An interval between the holes 71a, 71b, and an interval between the holes 71b, 71c are different, and the interval between the holes 71a, 71b is larger than the interval between the holes 71b, 71c. Additionally, the interval between the holes 71a, 71b is the same (including substantially the same) as an interval between the holes 72a, 72b facing the holes 71a, 71b. The interval between the holes 71b, 71c, and an interval between the holes 72b, 72c facing the holes 71b, 71c are the same.

The storage bag 21 is a bag using, for example, polyethylene as a material. The storage bag 21 has an opening in an upper part. Banknotes transported by the transport unit 3 are stored from the opening of the storage bag 21.

A bar code 73 is printed on the storage bag 21. The bar code 73 indicates recognition information for recognizing the storage bag 21. The recognition information may be, for example, a serial number of the storage bag 21. The bar code 73 may be printed on both sides of the storage bag 21.

The storage bag 22 also has a configuration similar to the storage bag 21 illustrated in FIG. 3, and has holes. Additionally, a bar code is printed on the storage bag 22, similarly to the storage bag 21. The bar code printed on the storage bag 22 is recognition information for recognizing the storage bag 22, and indicates the recognition information different from the bar code 73 of the storage bag 21.

Figure 4:
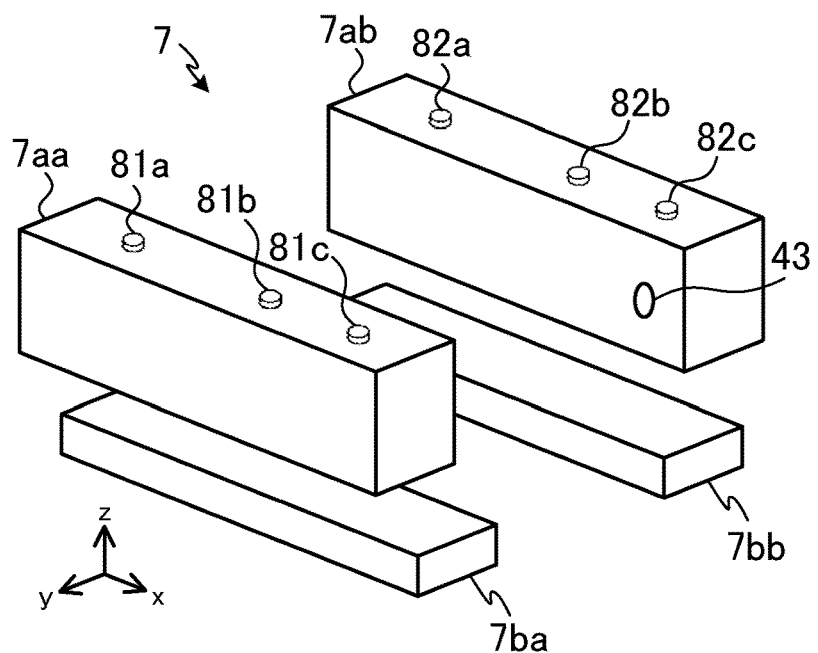
FIG. 4 is a perspective view of mounting sections and stages of a frame of FIG. 1.

FIG. 4 is a perspective view of the mounting sections 7aa, 7ab and the stages 7ba, 7bb of the frame 7 of FIG. 1. As illustrated in FIG. 4, the mounting section 7aa has pins (projections) 81a to 81c on an upper surface. The mounting section 7ab has pins 82a to 82c on an upper surface. The mounting sections 7aa, 7ab are disposed on the same horizontal plane (on an xy plane), and is fixed to the frame 7.

An interval between the pins 81a, 81b, and an interval between the pins 81b, 81c are different, and the interval between the pins 81a, 81b is larger than the interval between the pins 81b, 81c. Additionally, the interval between the pins 81a, 81b, and an interval between the pins 82a, 82b facing the pins 81a, 81b are the same. The interval between the pins 81b, 81c, and an interval between the pins 82b, 82c facing the pins 81b, 81c are the same.

The holes 71a to 71c provided in the storage bag 21 are engaged with the pins 81a to 81c, respectively. The holes 72a to 72c provided in the storage bag 21 are engaged with the pins 82a to 82c, respectively. Consequently, the storage bag 21 is suspended between the mounting sections 7aa, 7ab, and is mounted on the frame 7 as illustrated in FIG. 1. Intervals between the pins 81a to 81c, 82a to 82c of the mounting sections 7aa, 71ab are configured as illustrated in FIG. 4, and intervals between the holes 71a to 71c, 72a to 72c of the storage bag 21 are configured as illustrated in FIG. 3. Consequently, when the storage bag 21 is mounted on the mounting sections 7aa, 71ab, the bar code 73 of the storage bag 21 is directed in the +y-axis direction. In other words, the storage bag 21 is not mounted such that the bar code 73 is directed in the −y-axis direction. That is, the storage bag 21 is mounted such that the bar code 73 is directed in the predetermined orientation.

The mounting section 7ab has the sensor 43 on such a surface as to face the mounting section 7aa. The sensor 43 detects the storage bag 21 being mounted on the mounting sections 7aa, 7ab. For example, light is shielded by mounting the storage bag 21 on the mounting sections 7aa, 7ab, so that the sensor 43 is an optical sensor that detects the storage bag 21 being mounted. When the sensor 43 detects the storage bag 21 being mounted on the mounting sections 7aa, 7ab, a detection signal indicating that the storage bag 21 is mounted on the frame 7 is transmitted to the control section 30.

The stage 7ba is provided in the frame 7 so as to be movable in the ±y-axis direction. On the other hand, the stage 7bb is fixed to the frame 7.

The stage 7ba is moved in the ±y-axis direction by the stage driving section 41. The stages 7ba, 7bb are disposed on the same horizontal plane (on the xy plane). When the stage 7ba moves in the −y-axis direction, the stage 7ba comes into contact with the stage 7bb.

When the storage bag 21 is mounted on the mounting sections 7aa, 7ab, or when the banknote is stored in the storage bag 21, the stage 7ba moves to (is disposed at) a position separated from the stage 7bb (moves at a position illustrated in FIG. 1 or FIG. 4). On the other hand, when the storage bag 21 is retrieved, the stage 7ba moves toward the stage 7bb. Consequently, the opening of the storage bag 21 is closed.

Figures 5, 6, 7:
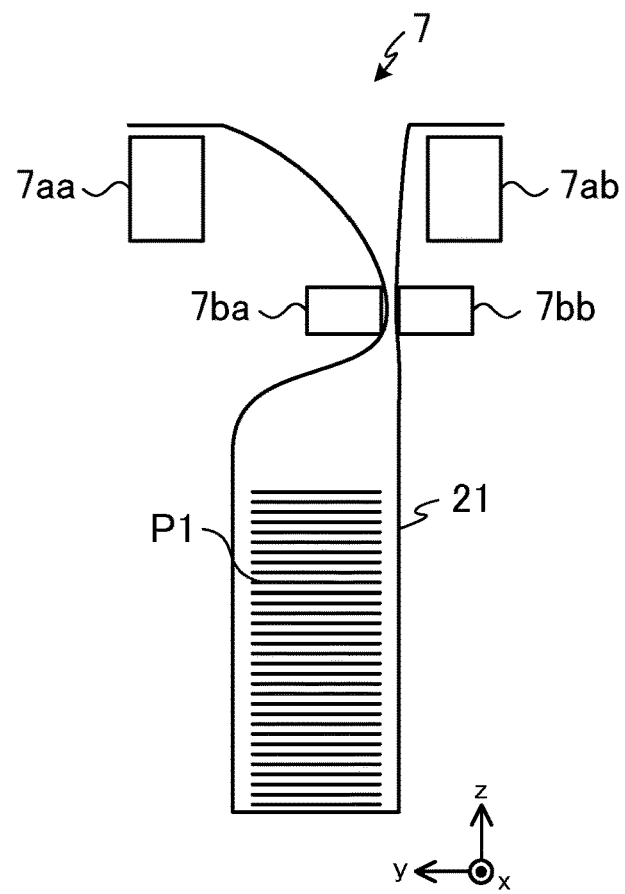
FIG. 5 is a diagram illustrating a state in which an opening of the storage bag is closed.
FIG. 6 is a diagram illustrating a data configuration example of a storage section.
FIG. 7 is a diagram illustrating a data configuration example of the storage section.

FIG. 5 is a diagram illustrating a state in which the opening of the storage bag 21 is closed. In FIG. 5, components identical with the components in FIG. 1 and FIG. 4 are denoted by the same reference numerals. In FIG. 5, illustration of the pins 81a to 81c, 82a to 82c illustrated in FIG. 4 is omitted. In FIG. 5, banknotes P1 stored in the storage bag 21 are illustrated.

The stage 7ba is moved toward the stage 7bb by the stage driving section 41 (moved in the −y-axis direction). For example, when the banknotes P1 are retrieved from the banknote processing apparatus 1, the stage 7ba moves toward the stage 7bb. The opening of the storage bag 21 is closed by the movement of the stage 7ba as illustrated in FIG. 5.

The stage 7ba has the heating section 42 such as a heater therein. The heating section 42 heats such a surface of the stage 7ba as to face the stage 7bb. When the stage 7ba moves to the stage 7bb, and the opening of the storage bag 21 is closed, the heating section 42 increases a temperature by control of the control section 30.

When the temperature of the heating section 42 is increased, a portion sandwiched between the stages 7ba, 7bb of the storage bag 21 is thermally welded. Consequently, the opening of the storage bag 21 is closed, and the banknotes P1 stored in the storage bag 21 are sealed in the storage bag 21.

Although the stage 7ba moves toward the stage 7bb in the above description, the present invention is not limited to this. The stage 7bb may move toward the stage 7ba. Additionally, the stage 7ba may move toward the stage 7bb, and the stage 7bb may move toward the stage 7ba.

The sensor 43 is mounted on the mounting section 7ab in the above description, but may be mounted on the mounting section 7aa. Additionally, the sensor 43 may be mounted on each of both the mounting sections 7aa, 7ab. The sensor 43 only needs to be able to detect the storage bag 21 being mounted, and is not limited to the optical sensor.

Although the heating section 42 is provided in the stage 7ba in the above description, the present invention is not limited to this. The heating section 42 may be provided in the stage 7bb, or may be provided in each of both the stages 7ba, 7bb.

The mounting sections 7aa, 7ab and the stages 7ba, 7bb of the frame 7 are described in the above description, and the mounting sections 8aa, 8ab and the stages 8ba, 8bb of the frame 8 are similarly configured. For example, the mounting sections 8aa, 8ab also have pins for suspending the storage bag 22, similarly to the mounting sections 7aa, 7ab of the frame 7. The mounting section 8ab has a sensor 53 that detects the storage bag 22 being mounted. The stage 8ba is moved in the ±y-axis direction by the stage driving section 51. Additionally, the stage 8ba has a heating section 52 therein.

The sensor 43 is mounted on the mounting section 7ab of the frame 7, and is associated with the frame 7. The sensor 53 is mounted on the mounting section 8ab of the frame 8, and is associated with the frame 8. Accordingly, when a detection signal is output from the sensor 43, the control section 30 can determine that the storage bag is mounted on the frame 7. When a detection signal is output from the sensor 53, the control section 30 can determine that the storage bag is mounted on the frame 8.

In a conventional banknote processing apparatus, a frame (mounting section) to which a storage bag is mounted is previously determined. That is, a user has to mount a predetermined storage bag on a predetermined frame.

On the other hand, in the banknote processing apparatus 1, the frames 7, 8 to which the storage bags 21, 22 are mounted are not previously determined, and a user may mount the storage bags 21, 22 on either the frames 7, 8. That is, in the banknote processing apparatus 1, the storage bags 21, 22 can be mounted on both the frames 7, 8, so that a mounting error of the storage bags 21, 22 on the frames 7, 8 is suppressed.

Hereinafter, it is assumed that recognition information indicated by the bar code 73 printed on the storage bag 21 is "123456789". It is assumed that recognition information indicated by the bar code printed on the storage bag 22 is "987654321". It is assumed that frame information of the frame 7 is "A". It is assumed that frame information of the frame 8 is "B".

First, the storage bags 21, 22 are not mounted on the frames 7, 8. In this state, a user reads a bar code printed on one of the storage bags 21, 22 by use of the bar code reader 10. The user may read any of the bar codes of the storage bags 21, 22. Herein, it is assumed that the user reads the bar code 73 of the storage bag 21. The bar code reader 10 transmits the recognition information "123456789" indicated by the read bar code 73 to the control section 30.

The user reads the bar code 73, and thereafter the storage bag 21, the bar code 73 of which is read, is mounted on one of the frames 7, 8. The user may mount the storage bag 21 on any of the frames 7, 8. Herein, it is assumed that the storage bag 21 is mounted on the frame 7 (mounting sections 7aa, 71ab of the frame 7). The sensor 43 provided in the mounting section 1ab of the frame 7 detects the storage bag 21 being mounted, and transmits a detection signal to the control section 30.

When the control section 30 receives the detection signal from the sensor 43, it is determined that the storage bag 21 of the recognition information "123456789" received from the bar code reader 10 is mounted on the frame 7 of the frame information "A". Then, the control section 30 associates the recognition information "123456789" received from the bar code reader 10 with the frame information "A" of the frame 7, and stores the associated information in the storage section 61.

FIG. 6 is a diagram illustrating a data configuration example of the storage section 61. As illustrated in FIG. 6, the recognition information "123456789" of the storage bag 21 read by the bar code reader 10, and the frame information "A" of the frame 7 to which the storage bag 21 are mounted are associated to be stored in the storage section 61.

Now, the user reads the bar code which is printed on another storage bag 22, and is not read, by use of the bar code reader 10. The bar code reader 10 transmits the recognition information "987654321" indicated by the read bar code to the control section 30.

The user reads the bar code, and thereafter mounts the storage bag 22 on one of the frames 7, 8. The user has already mounted the storage bag 21 on the frame 7, and therefore mounts the storage bag 22 on the frame 8. The sensor 53 provided in the mounting section 8ab of the frame 8 detects the storage bag 22 being mounted, and transmits a detection signal to the control section 30.

When the control section 30 receives the detection signal from the sensor 53, the control section 30 determines that the storage bag 22 of the recognition information "987654321" received from the bar code reader 10 is mounted on the frame 8 of the frame information "B". Then, the control section 30 associates the recognition information "987654321" received from the bar code reader 10 with the frame information "B" of the frame 8, and stores the associated information in the storage section 61.

FIG. 7 is a diagram illustrating a data configuration example of the storage section 61. As illustrated in FIG. 7, the recognition information "987654321" of the storage bag 22 read by the bar code reader 10, and the frame information "B" of the frame 8 to which the storage bag 22 are mounted are associated to be stored in the storage section 61. The recognition information "123456789" illustrated in FIG. 7, and the frame information "A" are the recognition information of the storage bag 21 first mounted on the frame 7, and the frame information of the frame 7.

Thus, the storage bags 21, 22, the recognition information of each of which is read by the bar code reader 10, are mounted on any of a plurality of the frames 7, 8, and the sensors 43, 53 of the frames 7, 8 to which the storage bags 21, 22 are mounted transmit detection results of the storage bags 21, 22 being mounted on the control section 30. Then, the control section 30 associates the frame information associated with the sensors 43, 53 that transmit the detection results, and the recognition information received by the communication interface section 62. Consequently, the storage bags 21, 22 may be mounted on any of the frames 7, 8, and the banknote processing apparatus 1 can suppress a mounting error of the storage bags 21, 22 to the frames 7, 8.

The storage bag 21 is first mounted on the frame 7, and thereafter the storage bag 22 is mounted on the frame 8 in the above description, but the present invention is not limited to the order mentioned. For example, the storage bag 22 may be first mounted on the frame 7, and thereafter the storage bag 21 may be mounted on the frame 8. Consequently, the recognition information of the storage bags 21, 22 mounted on the frames 7, 8, and the frame information of the frames 7, 8 to which the storage bags 21, 22 are mounted are associated to be stored in the storage section 61.

The control section 30 can acquire the recognition information of the storage bag mounted on the frame 7, and the recognition information of the storage bag mounted on the frame 8 by, for example, reference of the storage section 61. The control section 30 can acquire, for example, the inventory amount of banknotes stored in the storage bag 21 and the inventory amount stored in the storage bag 22 on the basis of the acquired recognition information.

Figure 8:
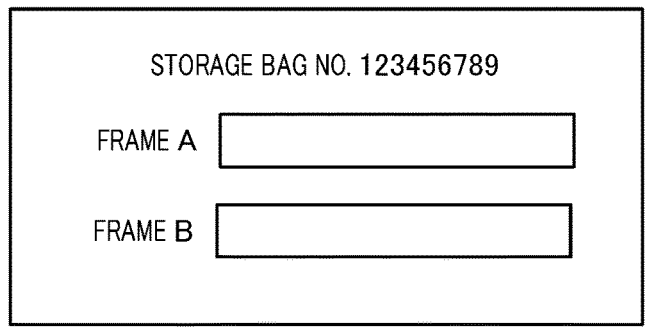
FIG. 8 is Part 1 of a diagram illustrating a screen example displayed on an operation display.

FIG. 8 is Part 1 of a diagram illustrating a screen example displayed on an operation display 9. It is assumed that the user reads the bar code 73 printed on the storage bag 21 among the two storage bags 21, 22 by the bar code reader 10. The bar code reader 10 transmits the recognition information "123456789" indicated by the read bar code 73 to the control section 30. The control section 30 displays the recognition information "123456789" received from the bar code reader 10 on the operation display 9, as illustrated in "storage bag No." of FIG. 8.

Figure 9:
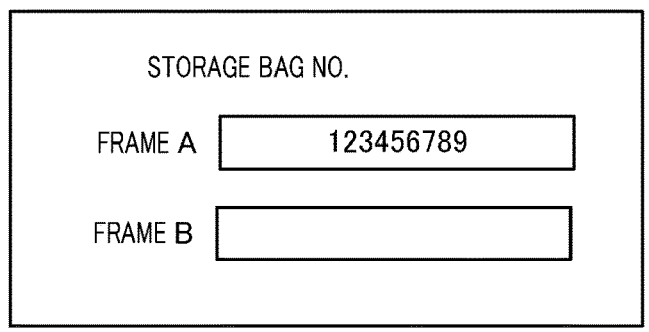
FIG. 9 is Part 2 of a diagram illustrating a screen example displayed on the operation display.

FIG. 9 is Part 2 of a diagram illustrating a screen example displayed on the operation display 9. When the user reads the bar code 73 of the storage bag 21 by use of the bar code reader 10, the user mounts the storage bag 21, the bar code 73 of which is read, on one of the frames 7, 8. Herein, it is assumed that the user mounts the storage bag 21 on the frame 7.

The sensor 43 of the frame 7 detects the storage bag 21 being mounted, and transmits a detection signal to the control section 30. The control section 30 determines that the storage bag 21 is mounted on the frame 7 of the frame information "A" by receiving of the detection signal from the sensor 43. The control section 30 displays the recognition information "123456789" of the storage bag 21 on a box corresponding to the frame A by the mounting determination of the storage bag 21 on the frame 7, as illustrated in the "frame A" of FIG. 9. Consequently, when the user sees the operation display 9, for example, the user can recognize that the storage bag 21 of the recognition information "123456789" is mounted on the frame 7 of the frame information "A".

A column of the "storage bag No." illustrated in FIG. 9 becomes a blank by display (movement) of the frame A of the recognition information "123456789" in the box (refer to the "storage bag No." of FIG. 8). In a case in which the storage bag 21 is mounted on the frame 8, the recognition information "123456789" of the storage bag 21 is displayed in a box corresponding to the frame B.

Figure 10:
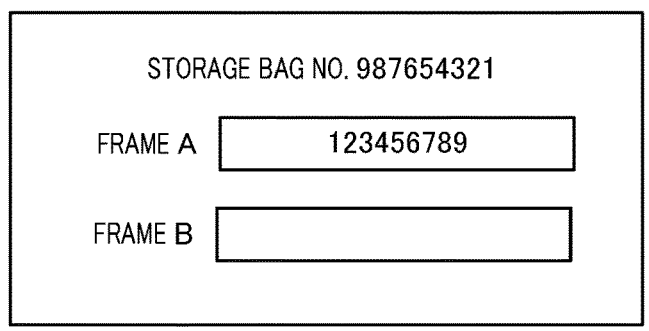
FIG. 10 is Part 3 of a diagram illustrating a screen example displayed on the operation display.

FIG. 10 is Part 3 of a diagram illustrating a screen example displayed on the operation display 9. The user mounts the storage bag 21 on the frame 7, and thereafter reads the bar code of another storage bag 22 by use of the bar code reader 10. The bar code reader 10 transmits the recognition information "987654321" indicated by the read bar code to the control section 30. The control section 30 displays the recognition information "987654321" received from the bar code reader 10 on the operation display 9, as illustrated in the "storage bag No." of FIG. 10.

Figure 11:
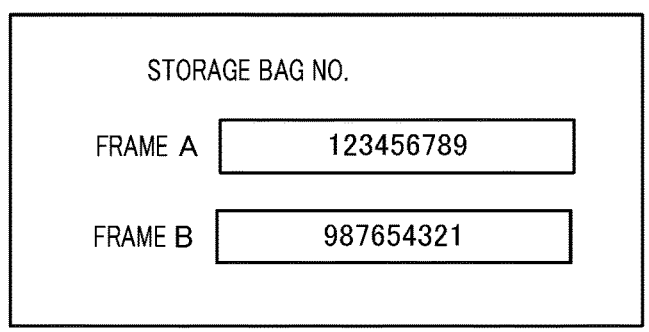
FIG. 11 is Part 4 of a diagram illustrating a screen example displayed on the operation display.

FIG. 11 is Part 4 of a diagram illustrating a screen example displayed on the operation display 9. When the user reads the bar code of the storage bag 22 by use of the bar code reader 10, the user mounts the storage bag 22, the bar code of which is read, on one of the frames 7, 8. The storage bag 21 has already mounted on the frame 7, and therefore the user mounts the storage bag 22 on the frame 8.

The sensor 53 of the frame 8 detects the storage bag 22 being mounted, and transmits a detection signal to the control section 30. The control section 30 determines that the storage bag 22 is mounted on the frame 8 of the frame information "B", by receiving of the detection signal from the sensor 53. The control section 30 displays the recognition information "987654321" of the storage bag 22 in the box corresponding to the frame B by the mounting determination of the storage bag 22 on the frame 8, as illustrated in the "frame B" of FIG. 11. Consequently, when the user sees the operation display 9, for example, the user can recognize that the storage bag 22 of the recognition information "987654321" is mounted on the frame 8 of the frame information "B".

A column of the "storage bag No." illustrated in FIG. 11 becomes a blank by display (movement) of the frame B of the recognition information "987654321" in the box (refer to the "storage bag No." of FIG. 10).

For example, the user sometimes reads the bar code 73 of the storage bag 21 by use of the bar code reader 10, does not mount the storage bag 21, the bar code 73 of which is read, on the frames 7, 8, and reads the bar code of another storage bag 22. In this case, the control section 30 overwrites the recognition information "123456789" of the storage bag 21 received from the bar code reader 10 on the recognition information "987654321" of the storage bag 22. That is, in a case in which the control section 30 receives the recognition information of one of the storage bags 21, 22 from the bar code reader 10, and thereafter receives the recognition information of the other of the storage bags 21, 22 without receiving any detection signal from the sensors 43, 53, the latter recognition information is processed as an effective recognition information.

As described above, in a case in which the user continuously reads the bar codes of the storage bags 21, 22 by use of the bar code reader 10, the recognition information displayed on the "storage bag No." of FIG. 8 is switched. For example, when the user reads the bar code 73 of the storage bag 21 by use of the bar code reader 10, the "123456789" is displayed in the "storage bag No." of FIG. 8. Thereafter, when the user reads the bar code of the storage bag 22 without mounting the storage bag 21 on the frames 7, 8, the "123456789" displayed in the "storage bag No." of FIG. 8 is switched to display of the "987654321".

Figure 12:
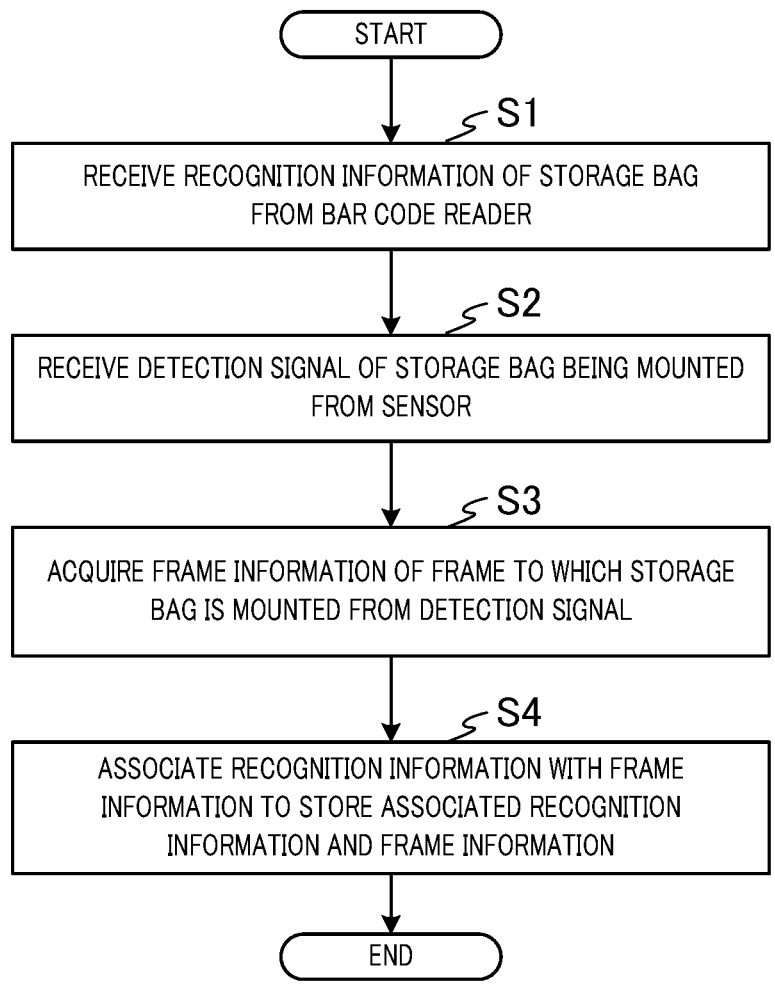
FIG. 12 is a flowchart illustrating an operation example of a control section.

FIG. 12 is a flowchart illustrating an operation example of the control section 30. The user reads the bar code of one of the storage bag 21 and the storage bag 22 by use of the bar code reader 10. The control section 30 receives the recognition information of the storage bag 21, 22 read by the bar code reader 10 from the bar code reader 10 (Step S1).

After reading the bar code by use of the bar code reader 10, the user mounts the storage bag 21, 22, the bar code of which is read, on the frame 7, 8.

The control section 30 receives a detection signal from the sensor 43, 53 of the frame 7, 8 (Step S2).

The control section 30 acquires the frame information of the frame 7, 8 to which the storage bag 21, 22 is mounted, from the detection signal received in Step S2 (Step S3). For example, in a case in which the control section 30 receives the detection signal from the sensor 43, the control section 30 determines that the frame to which the storage bag 21, 22 is mounted is the frame 7, and acquires the frame information "A". On the other hand, in a case in which the control section 30 receives the detection signal from the sensor 53, the control section 30 determines that the frame to which the storage bag 21, 22 is mounted is the frame 8, and acquires the frame information "B".

The control section 30 associates the recognition information received in Step S1 with the frame information acquired in Step S3 to store the associated recognition information and frame information in the storage section 61 (Step S4).

In a case in which the user reads the recognition information of the bar code of the other of the storage bags 21, 22, the bar code of which is not read, by use of the bar code reader 10, the control section 30 implements processes of Step S1 to S4.

As described above, the banknote processing apparatus 1 that stores banknotes in the storage bags 21, 22 has a plurality of the frames 7, 8 to which a plurality of the storage bags 21, 22 are mounted, each the storage bags having the recognition information attached thereto, the recognition information for recognizing each storage bag, and the communication interface section 62 that receives the recognition information from the bar code reader 10 which reads the recognition information. Additionally, the banknote processing apparatus 1 has the control section 30 that acquires the frame information of the frames 7, 8 to which the storage bags 21, 22 each having the recognition information attached thereto are mounted, the recognition information being received by the communication interface section 62, and associates the acquired frame information with the recognition information received by the communication interface section 62. Consequently, the storage bags 21, 22 may be mounted on either the frames 7, 8, and the banknote processing apparatus 1 can suppress a mounting error of the storage bags 21, 22 to the frames 7, 8.

Although the recognition information of each of the storage bags 21, 22 is read by the bar code reader 10 in the above description, the present invention is not limited to this. For example, the recognition information indicated by numbers or the like is printed on a lower part of the bar code of each of the storage bags 21, 22, and the operation display 9 may receive this recognition information from a user.

Embodiment 2

In Embodiment 2, a bar code indicating frame information is attached to each of frames 7, 8. A control section 30 associates frame information attached to each of the frames 7, 8 with recognition information of each of storage bags 21, 22 mounted on the frames 7, 8 and stores the associated frame information and recognition information in a storage section 61.

Figures 13, 14:
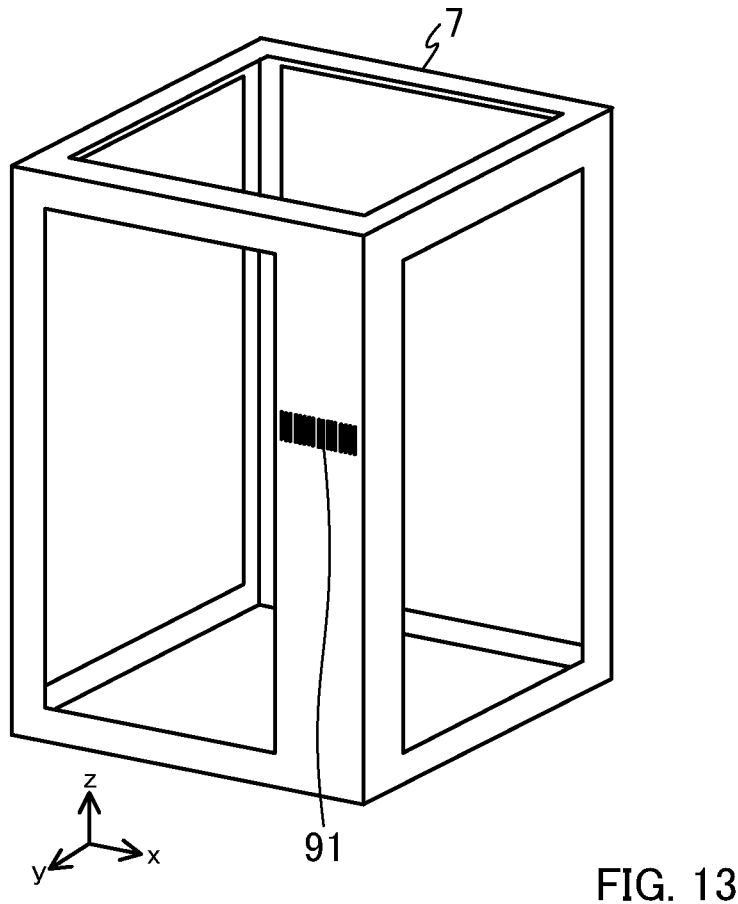
FIG. 13 is a perspective view of a frame according to Embodiment 2.
FIG. 14 is a diagram illustrating an operation procedure example of a user.

FIG. 13 is a perspective view of a frame 7 according to Embodiment 2. In FIG. 13, illustration of mounting sections 7aa, 1ab and stages 7ba, 7bb is omitted. As illustrated in FIG. 13, a bar code 91 indicating frame information "A" of the frame 7 is attached to the frame 7. A bar code indicating frame information "B" of the frame 8 is attached to the frame 8, similarly to the frame 7.

FIG. 14 is a diagram illustrating an operation procedure example of a user. First, a user mounts the two storage bags 21, 22 on the frames 7, 8. The user may mount the two storage bags 21, 22 on either the frames 7, 8. Herein, it is assumed that the user mounts the storage bag 21 on the frame 7, and mounts the storage bag 22 on the frame 8 (Step S11).

When the user mounts the two storage bags 21, 22 on the frames 7, 8, the user reads one of the bar codes attached to the frames 7, 8 by use of a bar code reader 10. The user may first read either of the bar codes attached to the frames 7, 8. Herein, it is assumed that the user reads the bar code 91 of the frame 7 by use of the bar code reader 10 (Step S12).

When the user reads the bar code of the frame 7, 8 by use of the bar code reader 10, the user reads the bar code of the storage bag 21, 22 mounted on the frame 7, 8, the bar code of which is read. In the above example, the user reads the bar code 91 of the frame 7 by use of the bar code reader 10, and therefore reads the bar code 73 of the storage bag 21 mounted on the frame 7 (Step S13).

The control section 30 associates the frame information of the frame 7 read in Step S12 with the recognition information of the storage bag 21 read in Step S13, and stores the associated frame information and recognition information in the storage section 61.

The user reads the bar code of the other of the frames 7, 8, the bar code of which is not read, by use of the bar code reader 10. In a case of the above example, the user reads the bar code of the frame 7 in Step S12, and therefore reads the bar code of the frame 8 (Step S14).

When the user reads the bar code of the frame 7, 8 by use of the bar code reader 10, the user reads the bar code of the storage bag 21, 22 mounted on the frame 7, 8, the bar code of which is read. The user reads the bar code of the frame 8 by use of the bar code reader 10 in Step S14, and therefore reads the bar code of the storage bag 22 mounted on the frame 8 (Step S15).

The control section 30 associates the frame information of the frame 8 read in Step S14 with the recognition information of the storage bag 22 read in Step S15, and stores the associated frame information and recognition information in the storage section 61.

Figure 15:
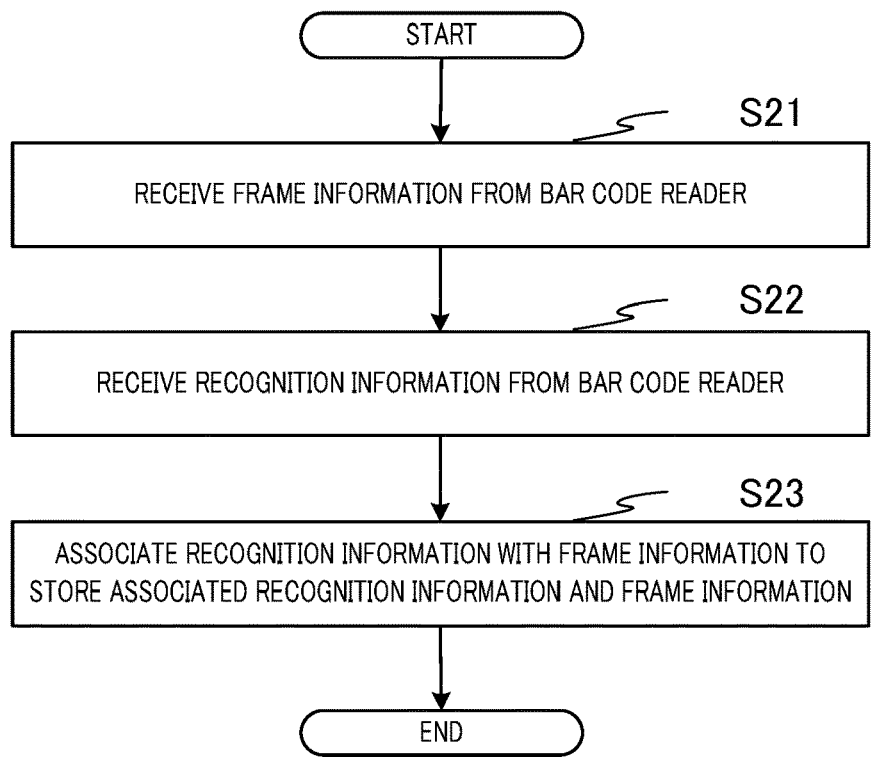
FIG. 15 is a flowchart illustrating an operation example of a control section.

FIG. 15 is a flowchart illustrating an operation example of the control section 30. It is assumed that the storage bags 21, 22 are mounted on the frames 7, 8 by a user.

The user reads the bar code of one of the frames 7, 8 by use of the bar code reader 10. The control section 30 receives the frame information of the frame 7, 8 (one of the frames) read by the bar code reader 10, from the bar code reader 10 (Step S21).

The user reads the bar code of the storage bag 21, 22 mounted on the frame 7, 8, the frame information of which is read, by use of the bar code reader 10. The control section 30 receives the recognition information of the storage bag 21, 22 read by the bar code reader 10, from the bar code reader 10 (Step S22).

The control section 30 associates the frame information received in Step S21 with the recognition information received in Step S22, and stores the associated frame information and recognition information in storage section 61 (Step S23).

In a case in which the user reads the bar code of the other of the frames 7, 8, the bar code of which is not read, by use of the bar code reader 10, the control section 30 implements processes of Step S21 to S23.

As described above, the frame information is attached to each of a plurality of the frames 7, 8, the communication interface section 62 receives the frame information from the bar code reader 10 that reads the frame information. The control section 30 associates the recognition information received by the communication interface section 62 with the frame information. Consequently, the storage bags 21, 22 may be mounted on either of the frames 7, 8, and the banknote processing apparatus 1 can suppress a mounting error of the storage bags 21, 22 to the frames 7, 8.

The order of the operation procedure of Step S12, S13 of FIG. 14 may be reversed. Additionally, the order of the operation procedure of Step S14, S15 may be reversed. In this case, the order of the processes of Step S21, S22 of FIG. 15 is exchanged.

Although the user mounts the two storage bags 21, 22 on the frames 7, 8, and thereafter reads the bar codes of the frames 7, 8 and the bar codes of the storage bags 21, 22 in the above description, the present invention is not limited to this. For example, the user mounts one of the storage bags 21, 22 on one of the frames 7, 8, and thereafter reads the bar code of the storage bag 21, 22, and the bar code of the frame 7, 8 to which the storage bag 21, 22 is mounted. Thereafter, the user may mount the other of the storage bags 21, 22 on the other of the frame 7, 8 to which the storage bags 21, 22 are not mounted, and read the bar code of the storage bag 21, 22, and the bar code of the frame 7, 8 to which the storage bag 21, 22 is mounted.

The frame information of each of the frames 7, 8 is read by the bar code, and therefore the mounting section 7ab, 8ab may not include the sensors 43, 53. Of course, the mounting section 7ab, 8ab may include the sensors 43, 53. In a case in which the mounting section 7ab, 8ab include the sensors 43, 53, the control section 30 can determine whether or not the storage bags 21, 22 are mounted on the frames 7, 8. In a case in which the control section 30 determines that the storage bags 21, 22 are mounted on the frames 7, 8, the control section 30 may control such that bar code reading operation of the bar code reader 10 is enabled. That is, in a case in which the storage bags 21, 22 are not mounted on the frames 7, 8, the control section 30 may cause the bar code reader 10 not to read the bar code. Alternatively, the control section 30 may not receive the recognition information to be transmitted from the bar code reader 10. By this process, for example, erroneous operation of reading the bar code of the storage bag 21, mounting the storage bag 21 on the frame 7, and reading the bar code of the frame 8 can be suppressed.

The control section 30 may store the recognition information and the frame information received from the bar code reader 10 in the storage section 61 so as to know the reception order. Then, the control section 30 may associate the recognition information with the frame information on the basis of the reception order of the recognition information and the frame information.

For example, it is assumed that one of the frame information and the recognition information is continuously received, and is stored in the storage section 61, and thereafter the other of the frame information and the recognition information is continuously received to be stored in the storage section 61. In this case, the control section 30 combines the order of one of the frame information and the recognition information continuously stored, and the order of the other of the frame information and the recognition information continuously stored, and associates the frame information with the recognition information. That is, the control section 30 associates the frame information and the recognition information in such a manner that stored order of the frame information and stored order of the recognition information coincide with each other.

More specifically, it is assumed that a reading procedure of reading the frame information of the frame 7 by the bar code reader 10, reading the frame information of the frame 8 by the bar code reader 10, reading the recognition information of the storage bag 21 mounted on the frame 7 by the bar code reader 10, and reading the recognition information of the storage bag 22 mounted on the frame 8 by the bar code reader is fixed.

In this case, the frame information of the frame 7 is stored in the storage section 61, and then the frame information of the frame 8 is stored. After the frame information of the frame 8 is stored, the recognition information of the storage bag 21 is stored in the storage section 61, and then the recognition information of the storage bag 22 is stored. The control section 30 associates the first stored frame information of the frame 7 among the frame information stored in the storage section 61 with the first stored recognition information of the storage bag 21 among the recognition information stored in the storage section 61. Additionally, the control section 30 associates the second stored frame information of the frame 8 among the frame information stored in the storage section 61 with the second stored recognition information of the storage bag 22 among the recognition information stored in the storage section 61. Thus, the control section 30 may associate the frame information with the recognition information by utilizing the storage order in the storage section 61.

The bar code reader 10 may collectively (simultaneously) read the bar code of the frame 7, and the bar code of the storage bag mounted on the frame 7. Then, the control section 30 may receive the collectively read frame information of the frame 7, and the recognition information of the storage bag mounted on the frame 7 through the communication interface section 62. The bar code reader 10 may collectively read the bar code of the frame 8 with the bar code of the storage bag mounted on the frame 8. Then, the control section 30 may receive the collectively read frame information of the frame 8, and the recognition information of the storage bag mounted on the frame 8 through the communication interface section 62. In this case, for example, erroneous operation of reading the bar code of the frame 7, and reading the bar code of the storage bag mounted on the frame 8 can be suppressed.

In a case of the above collective reading, the frame information of the frame 7 may be attached at such a position as to be collectively read along with the recognition information of the storage bag mounted on the frame 7, by the bar code reader 10. Similarly, the frame information of the frame 8 may be attached at such a position as to be collectively read along with the recognition information of the storage bag mounted on the frame 8, by the bar code reader 10. For example, the bar codes of the frames 7, 8 may be attached to the frames 7, 8 so as to be directed to the same orientation as the orientations to which the bar codes of the storage bags 21, 22 mounted on the frames 7, 8 are directed.

Figure 16:
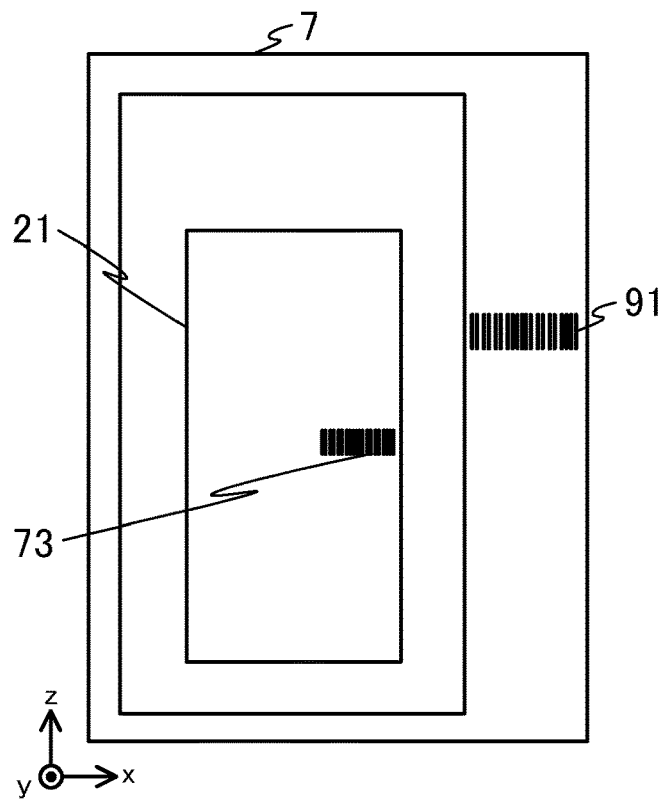
FIG. 16 is a diagram illustrating the orientations of a bar code of the frame and a bar code of a storage bag.

FIG. 16 is a diagram illustrating the orientations of the bar code 91 of the frame 7 and the bar code 73 of the storage bag 21. In FIG. 16, the frame 7 and the storage bag 21 are illustrated. In FIG. 16, illustration of the mounting sections 7aa, 7ab and the stages 7ba, 7bb is omitted. In FIG. 16, with omission of the illustration of the mounting sections 7aa, 7ab and the stages 7ba, 7bb, a state in which the storage bag 21 is suspended is not illustrated.

The bar code 73 of the storage bag 21 mounted on the frame 7 is printed on a surface directed in the +y-axis direction of the storage bag 21. The bar code 91 of the frame 7 is attached to such a surface as to be directed in the +y-axis direction of the frame 7. That is, the frame 7 has the bar code 91 attached to such a surface as to be directed in the same orientation as a surface to which the bar code 73 of the storage bag 21 is attached (surface directed in the +y-axis direction) when the storage bag 21 is mounted.

Consequently, the bar code 73 of the storage bag 21, and the bar code 91 of the frame 7 are directed in the same orientation (+y-axis direction), and therefore the bar code reader 10 can collectively read the bar code 73 of the storage bag 21, and the bar code 91 of the frame 7. The bar code 73 of the storage bag 21 may be printed on surfaces (both surfaces) directed in the ±y-axis direction.

When the storage bags 21, 22 are mounted on the frames 7, 8, the bar codes of the storage bags 21, 22 may be printed at places located directly below the stages 7ba, 7bb, 8ba, 8bb.

Figure 17:
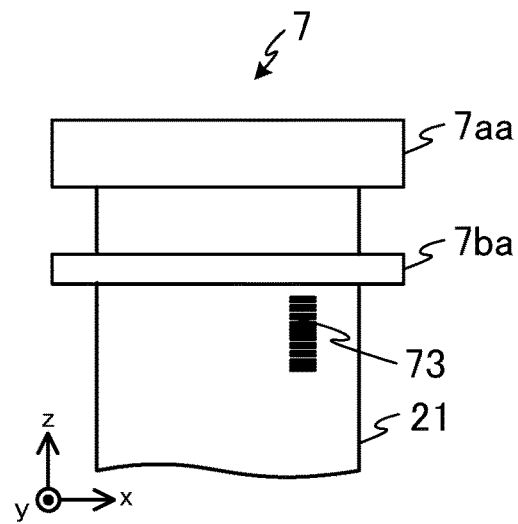
FIG. 17 is a diagram illustrating an example of a printing position of the bar code of the storage bag.

FIG. 17 is a diagram illustrating an example of a printing position of the bar code 73 of the storage bag 21. FIG. 17 illustrates the mounting section 7aa and the stage 7ba of the frame 7, and a part of the storage bag 21. In FIG. 17, illustration of the pins 81a to 81c of the mounting section 7aa is omitted.

As illustrated in FIG. 17, when the storage bag 21 is mounted on the frame 7 so as not to be tucked up (for example, when the storage bag 21 is mounted on the frame 7 so as not to be tucked up near the stages 7ba, 7bb as illustrated in FIG. 1), the bar code 73 of the storage bag 21 is printed so as to be located directly below the stage 7ba. For example, the bar code 73 is printed at a place located below by several centimeters (for example, 1 cm to 2 cm) from the stage 7ba. Additionally, the bar code 73 is printed such that the long edge direction is parallel to the z-axis direction.

Figure 18:
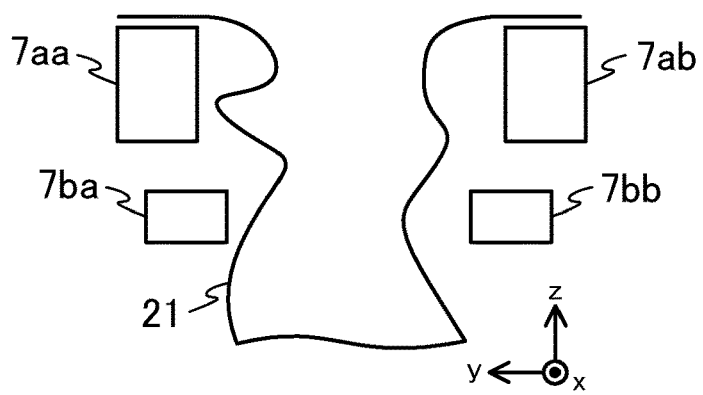
FIG. 18 is a diagram illustrating an example in which the storage bag is tucked up.

FIG. 18 is a diagram illustrating an example in which the storage bag 21 is tucked up. FIG. 18 illustrates the mounting sections 7aa, 1ab and the stages 7ba, 7bb of the frame 7, and a part of the storage bag 21. In FIG. 18, illustration of the pins 81a to 81c, 82a to 82c of the mounting section 7aa is omitted.

As illustrated in FIG. 18, the storage bag 21 is tucked up near the stages 7ba, 7bb. When the storage bag 21 is mounted on the frame 7 in a state of being tucked up, banknotes are not stored in the storage bag 21, and storage failure sometimes occurs.

Figure 19:
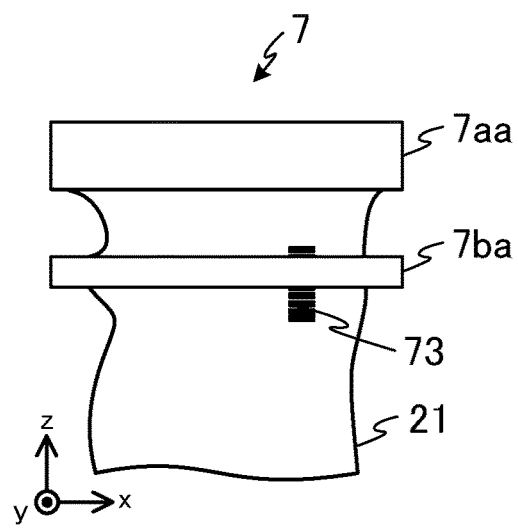
FIG. 19 is a diagram illustrating a state of the bar code when the storage bag is tucked up.

FIG. 19 is a diagram illustrating a state of the bar code 73 when the storage bag 21 is tucked up. In FIG. 19, components identical to the components of FIG. 17 are denoted by the same reference numeral. When the storage bag 21 is tucked up, the bar code 73 printed directly below the stage 7ba is hidden behind the stage 7ba, as illustrated in FIG. 19. Therefore, the user cannot read the bar code 73 of the storage bag 21 by use of the bar code reader 10.

Thus, when the bar code 73 is hidden behind the stage 7ba by tucking of the storage bag 21, the user cannot read the bar code 73 of the storage bag 21 by use of the bar code reader 10, unless the tucking of the storage bag 21 is eliminated. That is, when the user mounts the storage bag 21 on the frame 7, the tucking of the storage bag 21 is eliminated. Consequently, the banknote processing apparatus 1 can suitably store banknotes in the storage bag 21.

The frame information may be attached to the frames 7, 8 such that the bar code reader 10 is directed in the readable direction (direction in which the user can read the bar code by use of the bar code reader 10).

For example, a door provided in front of the banknote processing apparatus 1 (for example, the banknote processing apparatus 1 viewed from the left toward the right in FIG. 1) is open, and the frames 7, 8 are taken out of the banknote processing apparatus 1 (taken out in the +y-axis direction). The frame information is attached such that the bar code reader 10 is directed in the readable direction of the frames 7, 8 taken out of the banknote processing apparatus 1. For example, the frame information of the frame 7 is attached to the surface directed in the +y-axis direction of the frame 7, and the frame information of the frame 8 is attached to the surface directed in the −y-axis direction of the frame 8.

The frames 7, 8 may have a mechanism for mounting the storage bags 21, 22 such that the bar codes of the storage bags 21, 22 are directed in the readable directions.

For example, the pins 81a to 81c of the mounting section 7aa of FIG. 4, and the pins 82a to 82c of the mounting section 7ab are provided at positions different from each other. For example, when the mounting section 7aa rotates by 180 degrees, the positions of the pins 81a to 81c of the mounting section 7aa are different from the positions of the pins 82a to 82c of the mounting section 7ab. Therefore, when the storage bag 21 illustrated in FIG. 3 is mounted on the mounting sections 7aa, 7ab illustrated in FIG. 4, the bar code 73 is directed in the +y-axis direction. That is, the storage bag 21 illustrated in FIG. 3 is not mounted such that a surface having the bar code 73 attached thereto is directed in the −y-axis direction.

Like the above example, it is assumed that the frame information of the frame 7 is attached to such a surface as to be directed in the +y-axis direction of the frame 7 so as to be readable from the +y-axis direction. The bar code 73 of the storage bag 21 is mounted so as to be directed in the +y-axis direction without being directed in the −y-axis direction. Consequently, the frame information of the frame 7, and the bar code 73 of the storage bag 21 are easily read from the +y-axis direction by the bar code reader 10.

The mechanism in which the bar codes of the storage bags 21, 22 are directed in the readable directions is not limited to the above example. For example, the number of the pins of the mounting section 7aa, and the number of the pins of the mounting section 7ab may be different from each other. Additionally, the shapes of the pins of the mounting section 7aa, and the shapes of the pins of the mounting section 7ab may be different from each other.

In a case in which the frame information and the recognition information are collectively read, when only one of the frame information and the recognition information is read, the control section 30 may notify a user that the other of the frame information and the recognition information is not read. For example, the control section 30 may notify a user that the other of the frame information and the recognition information is not read by voice. Consequently, the user can collectively read the frame information and the recognition information again by use of the bar code reader 10.

In a case in which the frame information and the recognition information are collectively read, when the storage bag is detected to be being mounted, and thereafter at least one of the frame information and the recognition information is not read within a predetermined time, the control section 30 may notify a user that at least one of the frame information and the recognition information is not read.

The recognition information of the storage bags 21, 22, and the frame information of the frames 7, 8 associated with the recognition information of the storage bags 21, 22 are stored in the storage section 61 in each of the above embodiments, but the present invention is not limited to this. The control section 30 may transmit the associated recognition information and frame information to the host apparatus through the communication interface section 62.

The recognition information for recognizing each of the storage bags 21, 22 described in each of the above embodiment is not limited to the bar code. The recognition information for recognizing each of the storage bags 21, 22 may be a QR cord (registered trademark), a color cord, or the like. The frame information attached to each of the frames 7, 8 is not limited to the bar code, but may be a QR cord (registered trademark), a color cord, or the like.

The association of the recognition information of the storage bags 21, 22, and the frame information of the frames 7, 8 described in each of the above embodiments may be performed by an information processing apparatus such as a PC (Personal Computer) and a server connected to the banknote processing apparatus 1. For example, the information processing apparatus may have a function of the control section 30 illustrated in FIG. 2, and receive the recognition information of the storage bags 21, 22 transmitted from the bar code reader 10, and the frame information of the frames 7, 8. Additionally, the information processing apparatus may receive detection signals output by the sensors 43, 53. Then, the information processing apparatus may associate the recognition information of the storage bags 21, 22 with the frame information of the frames 7, 8, and store the associated recognition information and frame information in the storage section such as a memory. The host apparatus may have a function of the information processing apparatus.

REFERENCE SIGNS LIST 1 banknote processing apparatus
2 inlet section
2a feeding mechanism section
3 transport unit
4 recognition unit
5 storing/feeding unit
6 ejection section
6a stacking wheel driving section
7, 8 frame
7aa, 7ab, 8aa, 8ab mounting section
7ba, 7bb, 8ba, 8bb stage
9 operation display
10 bar code reader
21, 22 storage bag
30 control section
41, 51 stage driving section
42, 52 heating section
43, 53 sensor
61 storage section
62 communication interface section
71a to 71c, 72a to 72c hole
73, 91 bar code
81a to 81c, 82a to 82c pin
P1 banknote

What is claimed is:

1. A valuable medium processing apparatus that stores a valuable medium in a storage bag, the valuable medium processing apparatus comprising:
   a plurality of mounting sections, wherein each of the plurality of mounting sections is configured to mount the storage bag;
   an acquisition section that acquires recognition information attached to the storage bag, and mounting information of each of the plurality of mounting sections on which the storage bag has been mounted; and
   an association section that associates the recognition information and the mounting information with each other, the recognition information and the mounting information being acquired by the acquisition section, wherein:
   each of the plurality of mounting sections comprises a detection section that detects mounting of the storage bag, and
   when the detection section detects mounting of the storage bag, the acquisition section acquires the mounting information for recognizing each of the plurality of mounting sections on which the storage bag has been mounted.

2. The valuable medium processing apparatus according to claim 1, wherein
   in a case in which the acquisition section alternately acquires the mounting information and the recognition information, the association section associates the acquired mounting information with the acquired recognition information in pairs.

3. The valuable medium processing apparatus according to claim 1, further comprising:
   a storage section that stores the mounting information and the recognition information, wherein
   the association section associates the mounting information and the recognition information based on order of the mounting information and the recognition information stored in the storage section.

4. The valuable medium processing apparatus according to claim 3, wherein
   in a case in which one of the mounting information and the recognition information is continuously stored in the storage section, and thereafter the other of the mounting information and the recognition information is continuously stored in the storage section, the association section associates the mounting information and the recognition information in such a manner that stored order of the mounting information and stored order of the recognition information coincide with each other.

5. The valuable medium processing apparatus according to claim 1, further comprising:
   a reading apparatus that reads the mounting information and the recognition information, wherein:
   the mounting information is attached to each of the plurality of mounting sections, and
   the acquisition section acquires, from the reading apparatus, the mounting information attached to each of the plurality of mounting sections and the recognition information attached to the storage bag.

6. The valuable medium processing apparatus according to claim 5, wherein
the mounting information is attached at a position where the reading apparatus is allowed to collectively read the mounting information with the recognition information of the storage bag mounted on each of the plurality of mounting sections.

7. The valuable medium processing apparatus according to claim 6, wherein
in a case in which the reading apparatus reads only one of the recognition information and the mounting information, the acquisition section indicates a message to a user.

8. The valuable medium processing apparatus according to claim 6, wherein
after the detection section detects mounting of the storage bag,
in a case in which of the recognition information and the mounting information is not read by the reading apparatus within a predetermined time, the acquisition section indicates a message to a user.

9. The valuable medium processing apparatus according to claim 5, wherein
the mounting information is attached to each of the plurality of mounting sections so as to be directed in the same orientation as an orientation in which the recognition information of the storage bag mounted on each of the plurality of mounting sections is directed.

10. The valuable medium processing apparatus according to claim 5, wherein:
the mounting information of each of the plurality of mounting sections is attached so as to be directed in an orientation that allows the reading apparatus to read the mounting information, and
each of the plurality of mounting sections comprises a mechanism of mounting the storage bag such that the recognition information of the storage bag is directed in the orientation.

11. The valuable medium processing apparatus according to claim 10, wherein
the plurality of mounting sections comprises a first mounting section and a second mounting section that hold an opening of the storage bag, wherein
the first mounting section and the second mounting section have shapes different from each other.

12. The valuable medium processing apparatus according to claim 11, wherein:
the first mounting section and the second mounting section have projections for mounting the storage bag, and
the number of the projections of the first mounting section, and the number of the projections of the second mounting section are different from each other.

13. The valuable medium processing apparatus according to claim 11, wherein
the first mounting section and the second mounting section have projections for mounting the storage bag at positions different from each other.

14. The valuable medium processing apparatus according to claim 11, wherein:
the first mounting section and the second mounting section have projections for mounting the storage bag, and
a shape of the projection of the first mounting section, and a shape of the projection of the second mounting section are different from each other.

15. An information processing apparatus, comprising:
a reception section that receives recognition information from a reading apparatus that reads the recognition information for recognizing a storage bag, the recognition information being attached to the storage bag that stores therein a valuable medium, the storage bag being mounted on one of a plurality of a-mounting sections comprised in a valuable medium processing apparatus;
a mounting information acquisition section that acquires mounting information of the one of the plurality of mounting sections on which the storage bag having the recognition information attached thereto has been mounted, the recognition information being received by the reception section; and
a control section that associates the recognition information received by the reception section and the mounting information acquired by the mounting information acquisition section with each other, wherein:
when a detection section of the one of the plurality of mounting sections detects mounting of the storage bag, the mounting information acquisition section acquires the mounting information.

16. A valuable medium processing system, comprising:
a valuable medium processing apparatus that comprises a plurality of mounting sections, wherein each of the plurality of mounting sections is configured to mount a storage bag; and
an information processing apparatus that comprises:
a reception section that receives recognition information from a reading apparatus that reads the recognition information for recognizing the storage bag, the recognition information being attached to the storage bag,
a mounting information acquisition section that acquires mounting information of each of the plurality of mounting sections on which the storage bag having the recognition information attached thereto has been mounted, the recognition information being received by the reception section, and
a control section that associates the recognition information received by the reception section and the mounting information acquired by the mounting information acquisition section with each other, wherein:
when a detection section of each of the plurality of mounting sections detects mounting of the storage bag, the mounting information acquisition section acquires the mounting information.

17. A valuable medium processing method which is performed by a valuable medium processing apparatus that stores a valuable medium in a storage bag, the valuable medium processing method comprising:
receiving recognition information attached to the storage bag to be mounted on one of a plurality of mounting sections of the valuable medium processing apparatus;
acquiring mounting information of the mounting section on which the storage bag has been mounted when a detection section of the one of the plurality of mounting sections detects mounting of the storage bag; and
associating the received recognition information and the acquired mounting information with each other.

* * * * *